Sept. 2, 1930. M. LAND 1,774,923
VALVE CAGE
Filed Sept. 12, 1929
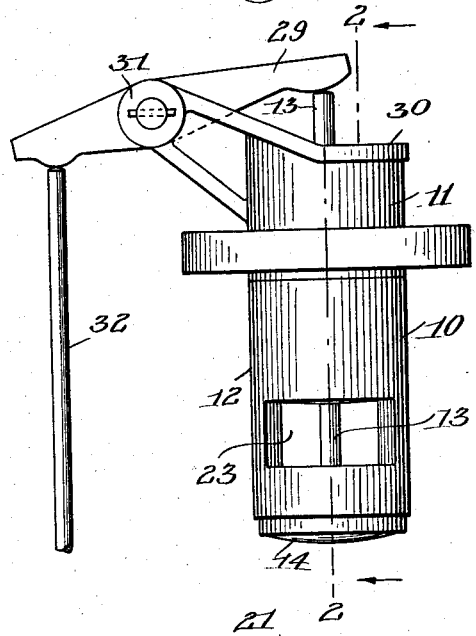
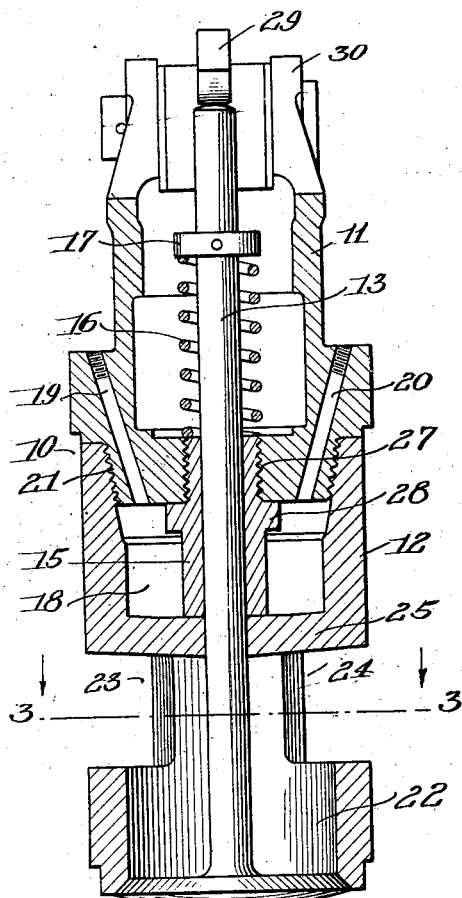
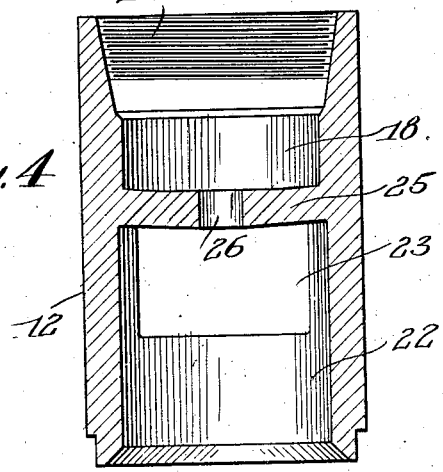
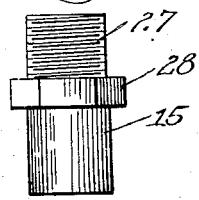
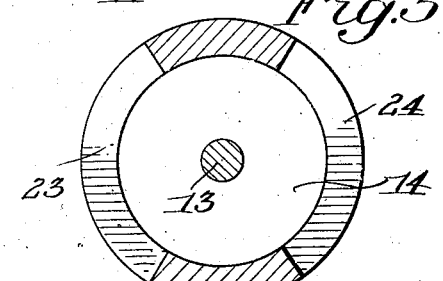
INVENTOR.
Millard Land
BY
his ATTORNEY.

Patented Sept. 2, 1930

1,774,928

UNITED STATES PATENT OFFICE

MILLARD LAND, OF LAKE CHARLES, LOUISIANA

VALVE CAGE

Application filed September 12, 1929. Serial No. 392,022.

The present invention relates to a valve cage, and more especially to a water cooled valve cage adapted for use with internal combustion engines, and has, among its objects, the provision of a water cooled valve cage with a renewable seat and a renewable valve stem guide.

In internal combustion engines great difficulty results from the overheating of the valves, the heat acting upon the valves being so great that many times the head of the valve becomes deformed due to the hammering of the valve upon its seat when so heated. Furthermore, trouble has been experienced through the sticking of the valve stems when the engine becomes hot. Lubricants placed along the stem become carbonized, and when the lower end of the valve cages become burnt away, it has been necessary to replace the entire valve cage, which entails a relatively heavy expense.

The present invention, briefly, comprises an arrangement for circulating a cooling medium about the stem of the valve and making the valve cage itself into two sections, upper and lower, which are separable from each other. The lower section is cup-shaped and there is placed within it a sleeve or bearing member through which the valve stem passes. Ducts opening into the cup-shaped section communicate with water circulation means, so that water may be circulated through this cup-shaped chamber, which thus becomes a cooling chamber; and if this lower portion becomes burnt during the operation of the engine, a new part may be substituted therefor, and the other original parts again used.

The invention will be readily understood by reference to the accompanying drawings, in which Figure 1 represents an elevation of the valve cage;

Figure 2 is a vertical section substantially on the line 2—2 of Figure 1, looking in the direction of the arrows;

Figure 3 is a horizontal section on the line 3—3 of Figure 2, in the direction of the arrows;

Figure 4 is a sectional view of the lower portion of the cage, at right angles to Figure 2; and Figure 5 is an elevation of the tubular bearing member, or guide, through which the valve stem operates.

Referring more particularly to the drawings, the valve cage is represented in entirety by the numeral 10, the cage being divided into the separable sections 11 and 12. Through the valve cage passes the valve stem 13 of the valve 14, the valve stem operating through the guide 15.

As will be seen from the drawings, the section 11 is made recessed, or hollow, to contain the spring 16, which normally holds the valve seated. The spring is retained in position on the valve stem between the sleeve member 15 and the collar 17 keyed to the stem 13. As will be apparent from Figure 2, the section 11 is threaded to receive the section 12 and guide 15, each in separable relation with respect to the section 11.

As will be seen from Figures 2 and 3, section 12 is cup-shaped forming a chamber 18, into which chamber communicate the ducts 19 and 20 which pass through the section 11 and which permit the introduction of cooling fluid into the chamber 18, and the circulation of such fluid therethrough. The section 12 is also threaded, as indicated at 21, so that it is adapted to be removably secured to the section 11, thus it can be replaced in the event it becomes burnt during the operation of the engine.

It will be seen from the drawings that section 12 is divided into two compartments or chambers, i. e., the cooling chamber 18 and what may be termed the "valve chamber" 22, having the ports 23 and 24 to serve as gas inlet or outlet ports. The valve 14 fits snugly against a valve seat formed at the lower extremity of the member 12, and may serve either as an intake or an exhaust valve. The chambers 18 and 22 are separated by the member 25, conveniently formed integrally with the casing, the member 25 being provided with a hole 26 therethrough for the reception of the valve stem 13.

The valve guide 15 is provided with threads 27 which permit its being removably secured to the section 11, as will be clear from Figure 2, the shoulder 28 giving a fluid-tight fit at this juncture, and the bottom face of the member 15 is smoothly fitted and pressed against the member 25, so as to make a fluid-tight fit at this point also. The circulation of the water or other cooling fluid through the chamber 18 serves to keep the sleeve 15 and valve stem 13 passing therethrough cool, so that the valve stem will not bind and stick through expansion due to overheating, but in the event that the guide 15 becomes worn, it can be replaced by a duplicate part.

Section 12, and the valve guide 15, being separable from section 11, either of these parts may be separately removed and replaced when this becomes necessary owing to burning or wear.

Section 11, not being subjected to the hard usage to which section 12 and sleeve 15 are exposed, will have a long life and will seldom, if ever, need replacement.

For clarity, and to facilitate the understanding of the structure, the valve stem 13 is shown in engagement with a rocker arm 29 supported on member 30 at 31, this being the point of oscillation. The rod 32 extends from the rocker arm to the usual cam shaft, not shown.

It will be understood that the specific form of the construction herein specifically described is illustrative only of the invention, and that many modifications in the details thereof can be made without departing from the concept of the invention; and it will be accordingly understood that it is desired and intended to embrace within the scope of this invention such modifications and changes as may adapt it to varying conditions and uses.

What I claim as my invention and desire to secure by Letters Patent is:

1. A valve cage, comprising the combination with a valve having a stem extending substantially through the cage, of a fixed section and a section separably secured thereto, the said separable section forming a seat for the valve, and defining with the fixed section a recess adapted to contain a cooling liquid, a bearing member for the valve stem contained within the recess and separably secured to the fixed section, and means adapted to introduce cooling liquid into the said recess and to circulate the said liquid through the recess and around the said bearing member.

2. A valve cage, comprising the combination with a valve having a stem extending substantially through the cage, of a fixed section and a section separably threaded thereto, the said separable section being divided into two compartments, one of the said compartments being cup-shaped and defining with the fixed section a recess adapted to contain a cooling liquid, the other of the said compartments of the separable section forming a seat for the valve and being provided with gas inlet and outlet ports, a bearing member for the valve stem contained with the recess and separably threaded to the fixed section, and ducts passing through the fixed section and communicating with the said recess, the said ducts being adapted to be connected with a source of cooling liquid to supply the said liquid to the said recess, and to permit the circulation of the said liquid through the recess around the bearing member.

3. A cage, for a poppet valve, comprising a hollow body provided with passages for the entrance and exit of cooling fluid, an inward extension from said body, a valve seat at the inner end of said extension, and a tubular guide for the valve stem, the inner and outer ends of said body being perforated for the reception of the valve stem, and the guide extending between the perforations and being removably fixed in fluid-tight engagement with said ends.

4. A cage, for a poppet valve, comprising a hollow body provided with passages for the entrance and exit of cooling fluid, an inward extension from said body, a valve seat at the inner end of said extension, and a tubular guide for the valve stem, the inner and outer ends of said body being perforated for the reception of the valve stem, and the valve guide being screwed into the perforation at one end and extending into pressure engagement with the other end, so as to make fluid-tight connections with both ends.

MILLARD LAND.